United States Patent Office 3,382,035
Patented May 7, 1968

3,382,035
PROCESS FOR PRODUCTION OF
PHOSPHORIC ACID
Jack D. Slater, Savannah, Ga., assignor, by mesne assignments, to Kaiser Aluminum & Chemical Corporation, Oakland, Calif., a corporation of Delaware
Filed July 1, 1966, Ser. No. 562,148
19 Claims. (Cl. 23—66)

ABSTRACT OF THE DISCLOSURE

Phosphate rock is digested with $HNO_3$ to produce $CaNO_3$ and free $H_3PO_4$. The resulting solution is neutralized with $NH_3$ to produce $NH_4NO_3$ and a di-calcium phosphate precipitate. The precipitate is treated with $H_3PO_4$ to produce monocalcium phosphate in solution which in turn is passed over a cation exchanger to produce product $H_3PO_4$.

Figure 1:
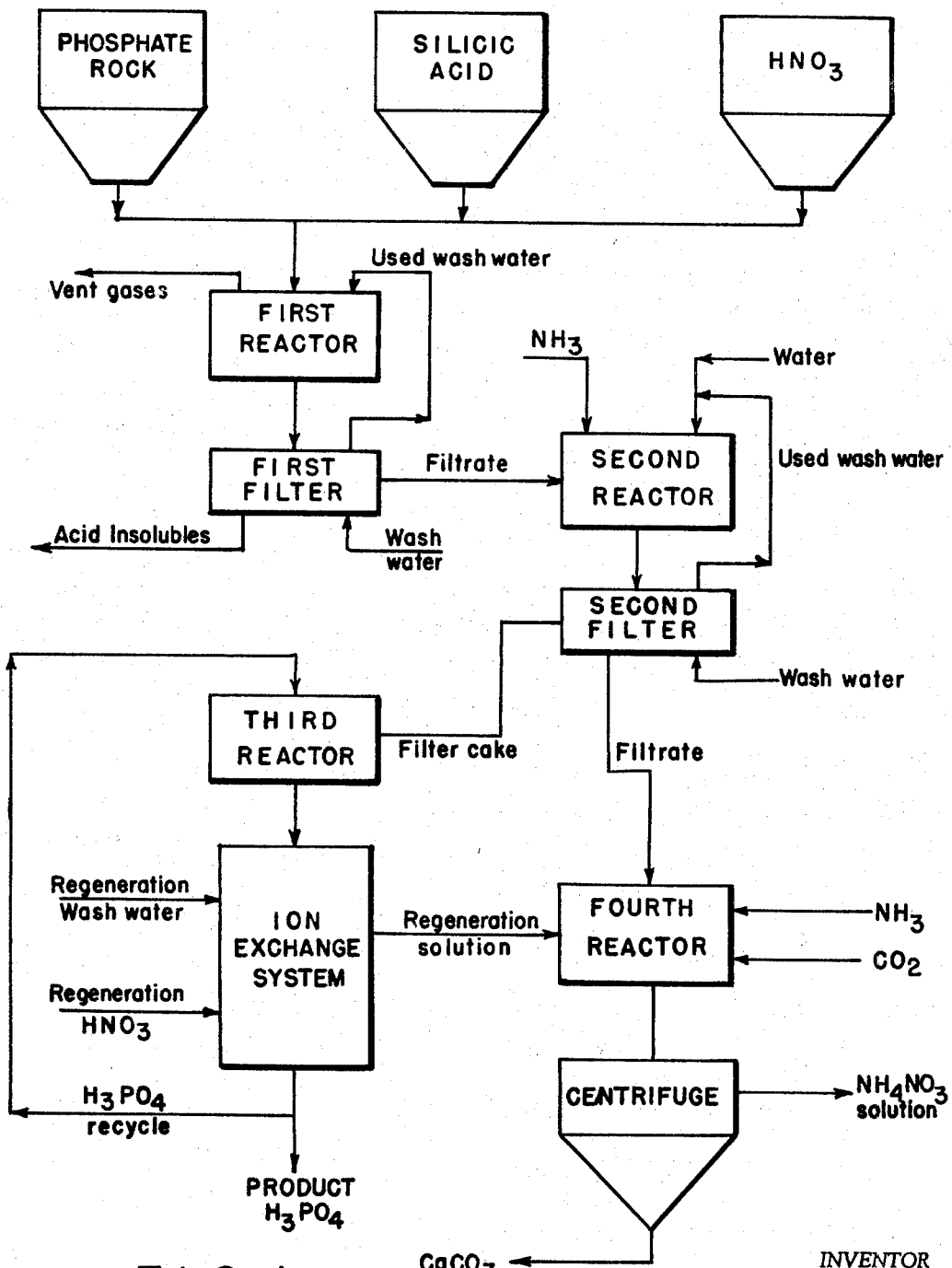

The cation exchange resin is regenerated with $HNO_3$ to produce $CaNO_3$ which is mixed with $NH_4NO_3$ produced in an earlier stage and reacted with $NH_3$ and $CO_2$ to recover by-product $CaCO_3$ and $NH_4NO_3$.

---

This invention relates to the preparation of phosphoric acid from phosphorus containing minerals or ores. More specifically, this invention relates to the preparation of phosphoric acid from tricalcium phosphate, including such minerals or ores wherein the tricalcium phosphate is associated with other compounds, for example, with calcium fluoride and calcium carbonate.

Background of the invention

Phosphoric acid is normally produced by the thermal decomposition of phosphate rock or by the sulphuric acid acidulation of phosphate rock. The thermal decomposition of phosphate rock is commercially feasible only where a readily available and economical source of energy is available. Acidulation of phosphate rock is normally used in locations where a cheap source of energy is not available. The prior art acidulation processes essentially involves the dissolution of the phosphate rock in sulphuric acid with the formation of calcium sulphates. The product obtained by this process, which is a liquid phosphoric acid and contain various impurities, is known as "wet process" acid in the trade. One of the problems associated with this process is that very little use can be made of calcium sulphate, the primary by-product, and in most cases this by-product is a disposal problem.

It has already been proposed to produce phosphoric acid by reacting crude tricalcium phosphate minerals with nitric acid or hydrochloric acid according to formulae:

$$Ca_3(PO_4)_2 + 6HNO_3 \rightarrow 3Ca(NO_3)_2 + 2H_3PO_4 \quad (1)$$

$$Ca_3(PO_4)_2 + 6HCl \rightarrow 3CaCl_2 + 2H_3PO_4 \quad (2)$$

In these acidulated mixtures, in addition to the phosphoric acid, there will be some excess of the acidulating acid along with the corresponding calcium salt. In the past it has been proposed that the phosphoric acid and excess acidulating acid be separated from the calcium salt by solvent extraction techniques using any number of organic solvents. The excess acidulating acid would then be separated from the phosphoric acid using countercurrent extraction with water and/or rectification in a suitable distillation column. While successful, such techniques are expensive, yield a low concentration of phosphoric acid requiring considerable heat for removing water, and give rise to equipment corrosion problems. In addition, the remaining calcium salt solutions are of marginal value. Patents illustrating these prior art processes include Baniel et al., 2,880,063; Chang, 3,245,777; Gattiker et al., 3,205,062; Le Baron et al., 2,849,280; Strauchen et al., 3,033,669; Long et al., 3,072,461; Gattiker et al., 3,195,980.

Objects of the invention

The principal object of the present invention is to provide a method permitting the recovery of virtually all the $P_2O_5$ of an ore in the form of aqueous $H_3PO_4$ by the decomposition of the ore with aqueous nitric acid. It is a further object of the present invention to provide a new and novel method for economically producing phosphoric acid without the use of sulfuric acid, as used in the conventional "wet-process" methods.

Another object of this invention is to produce a phosphoric acid of a concentration comparable to that produced by the "wet-process" by the use of nitric acid acidulation, with the formation of ammonium nitrate and calcium carbonate as valuable, recovered by-products.

A still further object of the present invention is to recover, in a nitric acid acidulation process, the nitrogen value of the nitric acid in such a form as to be satisfactory for the formulation of nitrogen solutions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

Summary of the invention

Phosphate-containing mineral or ore is acidulated with nitric acid to convert all of the calcium in the mineral or ore to calcium nitrate. A small amount of amorphous silica is added to the reaction mixture to produce silicon tetrafluoride. The major portion of fluorine present in the mineral passes out of the reactor with the vent gases, which may be subsequently treated for fluoride recovery. The reaction solution is filtered to remove acid insolubles and is then treated according to one of two alternative recovery processes.

First, the reaction solution may be passed to a reaction vessel wherein ammonia is introduced to convert calcium nitrate and phosphoric acid to dicalcium phosphate and ammonium nitrate. The dicalcium phosphate is precipitated and removed from the other products by filtration. The dicalcium phosphate is converted by the addition of phosphoric acid into monocalcium phosphate, which is passed through an organic cation exchange system wherein the calcium is removed and replaced by hydrogen, producing phosphoric acid. The ion exchange resin is regenerated when required, by the use of excess nitric acid. The regeneration solution, containing calcium nitrate and excess nitric acid, is passed to a reaction vessel wherein it is mixed with ammonium nitrate and calcium nitrate solution from the second filter operation. Ammonia and carbon dioxide gases are introduced into the reaction vessel and react with the calcium nitrate to produce calcium carbonate and additional ammonium nitrate. The calcium carbonate is removed from the solution by centrifuging, producing product dry calcium carbonate and ammonium nitrate solution.

In the alternative or second method of treating the filtered acidulation solution of the present invention, the reactor solution is neutralized with dicalcium phosphate to produce monocalcium phosphate. The reaction solution is filtered to remove excess monocalcium phosphate. The filtrate from the filtering operation, which contains monocalcium phosphate and calcium nitrate, is passed to a reaction vessel wherein ammonia gas is added to convert the calcium nitrate into dicalcium phosphate. The dicalcium phosphate so produced is separated from the reaction solution by centrifuging and is then recycled to the second reactor. The centrifuged solution, containing ammonium nitrate and calcium nitrate, is passed to a 5th reactor wherein ammonia and carbon dioxide gases convert the feed products into calcium carbonate and ammonium nitrate. These products are separated by centrifuging.

The monocalcium phosphate filter cake produced by the second filtering operation is solubilized by recycle phosphoric acid and dilution water in a third reactor. The reactor product solution is then passed to an ion exchange column wherein the calcium ion is exchanged for hydrogen ions to produce product phosphoric acid. Regeneration solution from the calcium regeneration in the ion exchange system is passed to the 5th reaction vessel and treated, along with the centrifuged solutions, with ammonia and carbon dioxide.

Description of the invention

Figure 2:
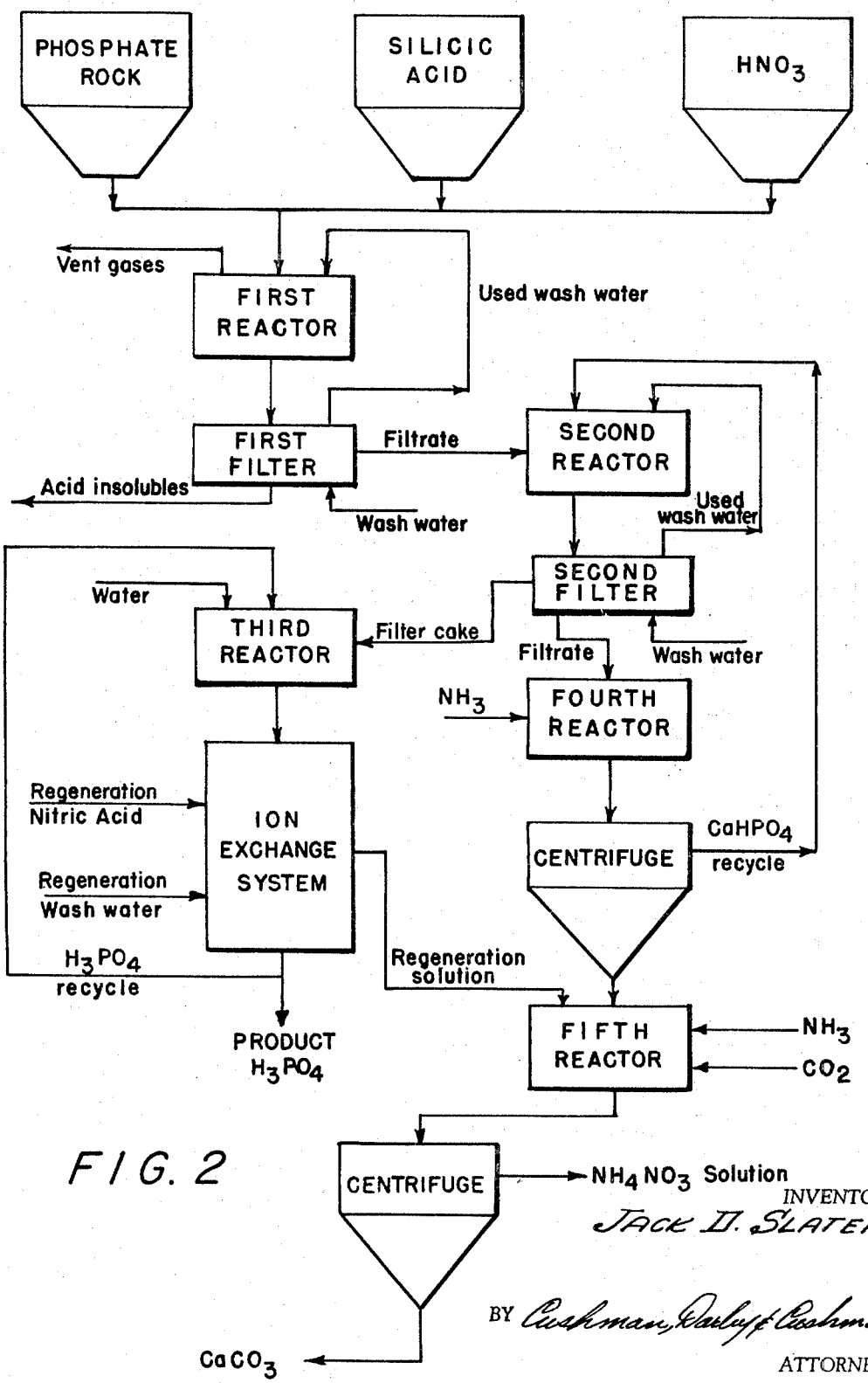

The phosphoric acid preparation process of the present invention will be more readily understood with reference to the accompanying drawings, in which FIGURE 1 is a flow diagram of the process of the present invention;

FIGURE 2 is an alternative flow diagram of the present invention, wherein the product from the first filter is treated in a different manner. In the following detailed description of the invention, reference will be made to these flow diagrams.

The term "dicalcium phosphate" as used in the present specification refers to the compound $CaHPO_4$, which is also known as dibasic calcium phosphate. The term "monocalcium phosphate" as used in the present application refers to the compound $Ca(H_2PO_4)_2$, which is also known as monobasic calcium phosphate.

In this invention the acidulation is carried out with nitric acid to convert all the calcium in the mineral or ore to calcium nitrate at a level fixed by stoichiometric consideration and the solubilities of the compounds of the resulting solution. Acidulation of the rock is preferably carried out at 120–130° C. for 15 to 30 minutes. A small amount of amorphous silica is added to the acidulated mixture to react with most of the fluorine in the tricalcium phosphate mineral.

$$SiO_2 + 4HF \rightarrow SiF_4 + 2H_2O \quad (3)$$

Water is added to the acidulating reactor (the first reactor) to maintain suitable solubility of the reaction products. Adequate water for this requirement is obtained as the wash water from the next or subsequent filtering operation.

The warm acidulate solution is then passed from the acidulation or first reactor to a first filter and the acid insoluble material is removed and discarded. Laboratory tests, using tricalcium phosphate mineral from North Carolina, indicate a recovery of $P_2O_5$, from this filtering operation, of 99.8%.

While previously mentioned, the nitric acid acidulation of the phosphorus rock is preferably carried out at 120 to 130° C. for 15 to 30 minutes at atmospheric pressures, this acidulation process may be carried out at temperatures of from 80° C. to 130° C. at times ranging from 15 to 360 minutes and at pressures of 100 to 760 mm. Hg.

The amount of amorphous silica added to the acidulated reaction mixture to react with the fluorine will vary according to the fluorine content of the ore or mineral being treated. Generally, the fluorine content of Florida phosphate rock will be 4% or less by weight of combined fluorine. Therefore, the amorphous silica added will generally amount to less than 2.0% by weight, based on the weight of the phosphate rock.

While the concentration of the nitric acid utilized for the acidulation for the phosphate rock may vary over wide ranges, i.e., 45 to 70% $HNO_3$, the concentration generally used will be that which is most economically available at the site of the phosphoric acid process unit or plant. For example, in Savannah, Ga., the preferred nitric acid concentration is within the range of 52 to 56% $HNO_3$. For economic reasons, the amount of nitric acid (based upon 100% $HNO_3$) normally used is an amount just sufficient to convert the total calcium content of the phosphate rock into calcium nitrate. However, this usage of nitric acid may vary from slightly less than stoichiometric amounts to much greater than stoichiometric amounts—i.e., 500% of the stoichiometric requirement. If an excess of nitric acid is utilized, a corresponding increase in the production of ammonium nitrate as a final product will be obtained.

The amount of water added to maintain suitable solubility of the reaction products will vary according to the particular ore or mineral being treated, the concentration of the acid used, and also with the particular process conditions utilized. Generally, the warm acidulate solution which is passed from the first reactor to the first filter will contain 3.5 to 6.0% acid insolubles.

While any of the more commonly used filters are suitable for separating acid insoluble material from the warm acidulate solution, a drum type continuous filter, using a multifilament polyfluorocarbon cloth, is preferred. The filter cloth required will vary according to the particular ore being treated and the pretreatment steps, such as grinding, which have been performed on the ore. If desired, a filter aid may be added to the solution although this has not been found to be necessary.

From the filter, the acidulate, which consists primarily of $Ca(NO_3)_2$ and $H_3PO_4$, is passed to the second reaction vessel. At this point either of two methods may be followed. Each method is suitable for subsequent production of phosphoric acid while each method has its own rather unique process considerations.

In the first method, ammonia is introduced into the second reaction vessel, which is kept at a controlled pH, preferably of 6.0. The ammonia reacts with the acidulate in accordance with the formula:

$$3Ca(NO_3)_2 + 2H_3PO_4 + 4NH_3 \rightarrow$$
$$2CaHPO_4 + 4NH_4NO_3 + Ca(NO_3)_2 \quad (4)$$

The precipitated dicalcium phosphate is passed to the second filter, water washed, then passed to the third reaction vessel. The wash water is returned to the second (the previous) reaction vessel to recover the phosphates and nitrates in the filter cake. The filtrate from the filtering operation is passed to the fourth reaction vessel for treatment. The amount of ammonia which is introduced into the second reaction vessel will vary considerably with the amount of excess nitric acid which has been used in the acidulation step. The pH of the solution in the second reactor is generally controlled within the range of about 4.0 to 6.2, preferably at 5.0 to 6.2, and most preferably at approximately 6.0. The optimum pH will vary slightly with the total concentration of the solution in the second reactor.

The filter used for recovering the precipitated dicalcium phosphate may be any of the conventional filters, among which may be mentioned the traveling pan filter and the continuous belt filter. While the amount of wash water utilized may vary considerably, preferably about 36 to 45 weight percent of wash water, based on the weight of the wet filter cake, is used.

In the third reaction vessel, recycle phosphoric acid, obtained as a slip stream from the phosphoric acid product line, is introduced in an excess amount, preferably 4.3 to 4.5 weight ration of recycle acid to third reactor feed, to convert the water-insoluble dicalcium phosphate to an acidic solution-soluble monocalcium phosphate, at a controlled temperature generally slightly above normal ambient temperature, and preferably within the range of 40 to 45° C., in accordance with the formula:

$$CaHPO_4 + YH_3PO_4 \rightarrow Ca(H_2PO_4)_2 + (Y-1)H_3PO_4 \quad (5)$$

The solution from the third reaction vessel is passed through an ion exchange system, containing an organic cation exchange resin, in which the calcium is removed and replaced by the hydrogen in accordance with the formula:

$$Ca(H_2PO_4)_2 + 2Resin\text{-}H \rightarrow 2H_3PO_4 + (Resin)_2Ca \quad (6)$$

The organic cation exchange resin utilized in the ion exchange system, may be any of the conventional cation exchange resins, including those operating on the socalled "hydrogen cycle," and sometimes called carbonaceous zeolites, for example, synthetic resins such as tannin-formaldehyde resins and such products as sulfonated coals and wood, peat and lignite. While various types of ion exchange systems may be utilized in the present process, such as "drain and wash" systems and liquid cation exchange systems, the preferred ion exchange system is a closed loop system known to the trade as a "Higgins contactor," sold by Chem Seps Corporation, Oak Ridge, Tennessee. An amount of ion exchange resin sufficient to convert all of the monocalcium phosphate into phosphoric acid should be utilized.

The cation exchange resin is regenerated to the hydrogen in form with excess nitric acid in accordance with the formula:

$$(Resin)_2Ca + 2HNO_3 \rightarrow 2Resin\text{-}H + Ca(NO_3)_2 \quad (7)$$

The product phosphoric acid (29–30% $P_2O$) may be passed to an evaporator for further concentration, for example, to 50–56% $P_2O_5$. A portion of the product acid is recycled to the third reaction vessel for dissolving the dicalcium phosphate as given by Reaction 5 above.

From the ion exchange system, the regenerated solution, containing calcium nitrate and excess nitric acid, is passed to the fourth reaction vessel and mixed with the ammonium nitrate and calcium nitrate solution from the second filter. Ammonia and carbon dioxide gases are introduced into the fourth reaction vessel to form calcium carbonate and additional ammonium nitrate in accordance with formula:

$$Ca(NO_3)_2 + 2NH_3 + CO_2 + H_2O \rightarrow CaCO_3 + 2NH_4NO_3 \quad (8)$$

Generally, about 4.5 to 5.0% by weight of ammonia and 4.5 to 5.0% by weight of carbon dioxide is used, based on the total weight of the calcium nitrate solution (that is, the regeneration solution from the ion exchange system and the filtrate from the second filter). The reaction with the ammonia and carbon dioxide gases is carried out at atmospheric pressure with temperature controlled between 0 to 60° C., preferably 20 to 30° C.

From the fourth reaction vessel, the solution containing solid calcium carbonate and dissolved ammonium nitrate is passed to a centrifuge where the calcium carbonate is separated and the ammonium nitrate solution is passed to a solution recovery system for use in preparing nitrogen solutions.

In the second method of treating the filtered acidulation solution as shown in FIG. 2, the solution in the second reactor is neutralized to a pH of about 1.0 with dicalcium phosphate recycled from a subsequent step in the process. Water from washing a filter in a subsequent filtering step is also added to maintain the correct water to solids ratio and control the amount of $P_2O_5$ dissolved in the solution in the second reactor.

$$CaHPO_4 + 2H_3PO_4 \rightarrow Ca(H_2PO_4)_2 \quad (9)$$

The solution to solids ratio is generally controlled within the range of 5.4 to 6.5. The amount of $P_2O_5$ dissolved in the second reactor solution is generally within the range of 6.6 to 7.2%. While the pH of the solution in the second reactor is preferably about 1.0, this pH can vary from 0.5 to 1.5.

The monocalcium phosphate in excess of solubility in the solution of the second reaction vessel is next filtered and washed with the recovered monocalcium passing to the third reactor. The wash water is returned to the second reactor.

The filtrate from the second filter is passed to the fourth reactor vessel where ammonia gas is added to give a solution pH of about 6.0 in accordance with Reaction 4, although the pH may vary from 5.0 to 6.2.

The dicalcium phosphate produced is separated by a centrifuge after the fourth reaction vessel and is then recycled to the second reaction vessel. The ammonium nitrate and calcium nitrate in the solution from the centrifuge is passed to the fifth reaction vessel for further processing.

In the third reaction vessel, recycle phosphoric acid, obtained as a portion of the phosphoric acid product, is introduced in an amount to dissolve the monocalcium phosphate. The temperature in the third reaction vessel will be somewhat above normal ambient temperature and preferably 40 to 45° C. Generally, a weight ratio of recycle acid to third reactor feed of 2.5 to 2.9 could be utilized to dissolve the monocalcium phosphate.

The solution is then passed through a cation exchange system as given above in the first method (Reaction 6) with a portion of the product being recycled to the third reactor and the balance going to an evaporator for concentration. Following calcium regeneration (Reaction 7) the regeneration solution from the ion exchange system is passed to the fifth reaction vessel and mixed with the solutions from the centrifuge (used to remove dicalcium phosphate). The mixed solution is then treated with ammonia and carbon dioxide gases (Reaction 8) with separation of calcium carbonate from the ammonium nitrate solution in the same manner as previously given above for the first method. The amount of ammonia used may vary from 4.6 to 5.2% by weight, based on the weight of calcium nitrate solution, and the amount of carbon dioxide may vary from 5.4 to 5.8% by weight, based on the weight of calcium nitrate solution.

One advantage of the present processes is that it is unnecessary to ion exchange all of the calcium ions originally present in the phosphate rock. For example, approximately one-third of the calcium process by the process of FIG. 1 does not pass through the ion exchange system, as the filtrate from the second filter is not subsequently ion exchanged. The process of FIG. 2 allows two-thirds of the calcium present in the first reactor to be processed without passing through the ion exchange system. Because of this reduction in the total amount of calcium fed to the ion exchange system, much smaller ion exchange columns may be utilized, resulting in easier process control and greater economy.

An additional and major advantage of the present processes is that no undesired by-products are formed, other than the acid insoluble material which is discharged from the first filter. While most, if not all, of the prior phosphoric acid processes of the prior art produced, as unattractive by-products, either calcium chloride or calcium sulphate, the present processes produce, as valuable by-products, calcium carbonate and ammonium nitrate. The ammonium nitrate finds ready utility in such applications as the preparation of fertilizer solutions. The calcium carbonate, on the other hand, may be calcined and slaked to produce calcium hydroxide.

Example I

This example relates to the preparation of phosphoric acid and related by-products from tricalcium phosphate-containing minerals obtained from North Carolina and containing 33.0% $P_2O_5$ by the process of FIGURE 1. 303.7 parts of 33% phosphate containing rock, 6.0 parts of amorphous silica, 641.7 parts of nitric acid (based on 100% $HNO_3$), 172.8 parts of ammonia (based on 100% $NH_3$), 124.2 parts carbon dioxide (based on 100% $CO_2$), 592.8 parts of water, and 1468.5 parts of water in nitric acid solution were utilized as the raw starting materials.

The products produced by the process are 341.3 parts of 29.3% $P_2O_5$, 2479.2 parts of 32% $NH_4NO_3$, 282.7 parts of $CaCO_3$ (dry basis), 167.0 parts of vent gases and 39.5 parts of wet acid insoluble products.

The first reactor, which was maintained at a temperature of 120 to 130° C. was fed 303.7 parts of phosphate rock, 6.0 parts of silicic acid, 686.3 parts of 52% nitric acid and 167.0 parts of wash water from the first filter operation. 167.0 parts of vent gases were produced which were passed to a fluorine recovery unit. 996.0 parts of reactor product were produced and passed to the first filter. The filter cake was washed with 176.0 parts of wash water and 39.5 parts of wet acid insoluble filter cake was obtained. The 965.7 parts of filtrate were passed to the second reactor. 48.0 parts of $NH_3$ and 121.5 parts of wash water from the second filter were introduced to the second reactor. 1150.2 parts of second reactor product were obtained and filtered in the second filter to remove precipitated dicalcium phosphate. 303.4 parts of $$CaHPO_4 \cdot 2H_2O$$

were obtained as filter cake and passed to the third reactor. 958.3 parts of $Ca(NO_3)_2$ and $NH_4NO_3$ filtrate solution were passed to the fourth reactor. 124.8 parts of $NH_3$ gas and 124.2 parts $CO_2$ gas were introduced into the fourth reactor to convert the filtrate into calcium carbonate and an ammonium nitrate solution. The fourth reactor product was centrifuged, producing 262.7 parts of dry calcium carbonate and 2479.2 parts of 32% ammonium nitrate solution.

The third reactor, which had received the second filter cake, was held at approximately 45° C. 1344.6 parts of recycle phosphoric acid (29.3% $P_2O_5$) were introduced into the reactor to convert the dicalcium phosphate into monocalcium phosphate. The third reactor product was passed to a "Higgins contactor" ion exchange system. 1686 parts of product phosphoric acid were produced, which, after correction for the recycled phosphoric acid which was returned to the third reactor, amounted to a production of 341.3 parts of phosphoric acid solution (amounting to 100 parts of 100% $P_2O_5$ production).

During regeneration of the ion exchange system, 1423.9 parts of 20% nitric acid were introduced into the exchange column, along with 168.8 parts of dilution wash water. 1554.8 parts of regeneration solution were obtained, consisting principally of $Ca(NO_3)_2$ and $HNO_3$. This regeneration solution was introduced into the fourth reactor where it was treated along with the filtrate from the second filter.

Example II

This examples relates to the production of phosphoric acid by the process of FIG. 2, utilizing Florida phosphate rock containing 33.2% $P_2O_5$.

Raw materials include 303.1 parts phosphate rock, 6.0 parts amorphous silica, 494.3 parts of 100% nitric acid, 919.2 parts process water, 133.0 parts of 100% ammonia, 124.8 parts of 100% carbon dioxide and 881.1 parts of water in the nitric acid. The products include 333.4 parts of product phosphoric acid (30% $P_2O_5$), 166.7 parts of vent gases, 39.5 parts of acid insoluble filter cake, 2039.8 parts of 31% ammonium nitrate solution and 281.9 parts of dry calcium carbonate.

The first reactor, which was maintained at a temperature of 120 to 130° C., was fed 303.1 parts of phosphate rock, 6.0 parts of silicic acid, 685.0 parts of 52% nitric acid, and 166.7 parts of wash water from the first filter operation. 166.7 parts of vent gases were discharged to a fluoride recovery unit. 994.1 parts of the first reactor product were filtered in the first filter. The filter cake, which was washed with 175.8 parts of wash water, amounted to 39.4 parts of acid insoluble products. The filtrate, which amounted to 963.8 parts, was passed to the second reactor. 191.2 parts of recycle $CaHPO_4$ from the first centrifuge, and 489.8 parts of wash water from the second filter, were also introduced into the second reactor, which was maintained to about 25° C. at atmospheric pressure. 1644.6 parts of second reactor product was obtained and passed through the second filter. 221.12 parts of monocalcium phosphate ($CaH_2PO_4$) wet filter cake, which was washed with 533.7 parts of wash water, was obtained and introduced into the third reactor. 53.6 parts of dilution water and 600.1 parts of recycle phosphoric acid (30% $P_2O_5$) were also introduced into the third reactor, which was maintained at about 45° C. 875.0 parts of third reactor product were obtained and passed to the ion exchange system. 933.5 parts of ion exchange product were obtained which, after correction for the recycle phosphoric acid, amounted to 333.4 parts of 30% $P_2O_5$ (that is, 100 parts of 100% $P_2O_5$).

During the ion exchange regeneration cycle, 690.4 parts of 20% nitric acid and 156.1 parts of wash water were introduced into the ion exchange column. 788.0 parts of regeneration solution were obtained, which contained calcium nitrate and nitric acid. This regeneration solution was introduced into the fifth reactor.

The filtrate from the second filter amounted to 1467.6 parts of calcium nitrate and monocalcium phosphate solution. This filtrate was passed to the fourth reactor, into which 23.9 parts of ammonia gas were added to give a solution pH of 6.0. 1491.5 parts of fourth reactor product were obtained, which consisted of calcium nitrate, ammonium nitrate and dicalcium phosphate. 191.2 parts of dicalcium phosphate were separated from the fourth reactor product in the first centrifuge, leaving 1300.2 parts of ammonium nitrate and calcium nitrate solution, which were passed to the fifth reactor and mixed with the ion exchange regeneration solution. 109.1 parts of ammonia gas and 124.3 parts of carbon dioxide gas were introduced into the fifth reactor to convert the mixed solutions into calcium carbonate and an ammonium nitrate solution. 2321.7 parts of the fifth reactor product were obtained and centrifuged, producing 281.9 parts of dry calcium carbonate and 2039.8 parts of 31% ammonium nitrate solution.

Obviously many modifications and variations of the present invention are possible in the light of the above teachings. It is therefore to be understood that within the scope of the appended claims the invention may be practiced otherwise than as specifically described.

What is claimed is:
1. A process for the production of phosphoric acid comprising:
  (a) acidulating phosphate-containing minerals, or ores, with at least about a stoichiometric amount of nitric acid at a temperature of about 80° to about 130° C.;
  (b) separating insoluble materials from the acidulation solution;
  (c) treating the acidulation solution with ammonia to convert calcium nitrate and phosphoric acid in said solution to dicalcium phosphate and ammonium nitrate;
  (d) separating precipitated dicalcium phosphate from the treated acidulation solution;
  (e) converting and solubilizing the precipitated dicalcium phosphate into monocalcium phosphate by the addition of phosphoric acid;
  (f) passing the monocalcium phosphate solution through an organic cation exchange system to replace calcium ions with hydrogen ions, thereby producing product phosphoric acid;
  (g) regenerating the ion exchange system with nitric acid;
  (h) mixing the regeneration solution obtained from the regeneration of the ion exchange system with the treated acidulation solution of step (d);
  (i) reacting ammonia and carbon dioxide with the mixture of step (h) to convert the calcium nitrate into calcium carbonate and ammonium nitrate, and
  (j) separating the reaction product into by-product calcium carbonate and ammonium nitrate.

2. The process of claim 1 wherein said acidulation is performed in the presence of silicic acid in the amount sufficient to combine with the fluorine atoms present in said rock.

3. The process of claim 2 wherein less than 2 percent by weight of silicic acid, based on the weight of said rock, is used.

4. A process for the production of phosphoric acid comprising:
 (a) acidulating phosphate-containing minerals, or ores, with nitric acid;
 (b) separating insoluble materials from the acidulation solution;
 (c) neutralizing the acidulation solution with dicalcium phosphate to produce monocalcium phosphate;
 (d) separating excess monocalcium phosphate from the neutralized solution containing calcium nitrate;
 (e) treating the neutralized solution with ammonia to convert the calcium nitrate and dissolved excess phosphoric acid into dicalcium phosphate and ammonium nitrate;
 (f) separating insoluble dicalcium phosphate from the ammoniated solution;
 (g) solubilizing the monocalcium phosphate separated from the neutralized solution with phosphoric acid to produce a solution of monocalcium phosphate;
 (h) passing the resultant monocalcium phosphate solution through an ion exchange system to replace the calcium ions with hydrogen ions, thereby producing product phosphoric acid;
 (i) periodically regenerating the ion exchange system with nitric acid;
 (j) combining the regeneration solution obtained from the regeneration of the ion exchange system with ammoniated solution after the separation of dicalcium phosphate from the ammoniated solution;
 (k) converting the mixture of solutions from step (j) with ammonia and carbon dioxide to produce calcium carbonate and ammonium nitrate; and
 (l) separating the calcium carbonate and ammonium nitrate to produce by-products.

5. The process of claim 4 wherein said acidulation is performed in the presence of silicic acid in the amount sufficient to combine with the fluorine atoms present in said rock.

6. The process of claim 4 wherein less than 2 percent by weight of silicic acid, based on the weight of said rock, is used.

7. The process as claimed in claim 1 wherein the phosphate-containing minerals, or ores, are acidulated with an amount of nitric acid just sufficient to convert the total calcium content of the phosphate minerals or ores into calcium nitrate.

8. The process as claimed in claim 1 wherein the nitric acid acidulation is at a temperature of 120 to 130° C.

9. The process as claimed in claim 4 wherein the phosphate-containing minerals, or ores, are acidulated with an amount of nitric acid just sufficient to convert the total calcium content of the phosphate minerals or ores into calcium nitrate.

10. The process as claimed in claim 4 wherein the nitric acid acidulation is at a temperature of 120 to 130° C.

11. The process as claimed in claim 1 wherein the acidulation solution is treated with ammonia at a pH of 4.0 to 6.2.

12. The process of claim 1 wherein the precipitated dicalcium phosphate is converted into monocalcium phosphate by the addition of phosphoric acid, at a weight ratio of acid to feed of 4.3 to 4.5, at a controlled temperature above normal ambient temperature.

13. The process as claimed in claim 12 wherein said controlled temperature is 40 to 45° C.

14. The process as claimed in claim 1 wherein 4.5 to 5.0% by weight of ammonia and 4.5 to 5.0% by weight of carbon dioxide, based on the total weight of calcium nitrate solution, is used to convert calcium nitrate into calcium carbonate and ammonium nitrate.

15. The process as claimed in claim 14 wherein said calcium nitrate conversion is at a temperature of 0 to 60° C.

16. The process as claimed in claim 4 wherein the acidulation solution is neutralized with dicalcium phosphate to a pH of from 0.5 to 1.5, the solution to solids ratio is 5.4 to 6.5, and the $P_2O_5$ in the neutralized solution is from about 6.6 to about 7.2% by weight.

17. The process as claimed in claim 4 wherein the neutralized solution is treated with ammonia to produce a solution pH of from about 5.0 to about 6.2.

18. The process as claimed in claim 4 wherein the monocalcium phosphate separated from the neutralized solution is solubilized with phosphoric acid, at a weight ratio of acid to feed of from about 2.5 to about 2.9, at a temperature above normal ambient temperature.

19. The process as claimed in claim 4 wherein the mixture of solutions is converted with from about 4.6 to 5.2% by weight of ammonia and from about 5.4 to 5.8% by weight of carbon dioxide, based on the weight of calcium nitrate solution, to produce calcium carbonate and ammonia nitrate.

References Cited

UNITED STATES PATENTS

| | | | |
|---|---|---|---|
| 3,026,192 | 3/1962 | Tapin | 71—39 |
| 3,205,062 | 9/1965 | Gattiker et al. | 71—39 |
| 3,245,777 | 4/1966 | Chang | 23—165 X |
| 3,342,580 | 9/1967 | De Rooij | 23—165 X |

FOREIGN PATENTS

| | | |
|---|---|---|
| 1,347,183 | 12/1963 | France. |
| 1,367,595 | 7/1964 | France. |

OSCAR R. VERTIZ, *Primary Examiner.*

A. GREIF, *Assistant Examiner.*